US011647157B2

(12) United States Patent
Gorny et al.

(10) Patent No.: US 11,647,157 B2
(45) Date of Patent: *May 9, 2023

(54) MULTI-DEVICE TELECONFERENCES

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,935

(22) Filed: Jan. 31, 2022

(65) Prior Publication Data
US 2022/0159214 A1 May 19, 2022

Related U.S. Application Data

(63) Continuation of application No. 16/857,583, filed on Apr. 24, 2020, now Pat. No. 11,240,470.
(Continued)

(51) Int. Cl.
 *H04N 7/15* (2006.01)
 *H04M 3/56* (2006.01)
 *H04N 7/14* (2006.01)

(52) U.S. Cl.
 CPC ............ *H04N 7/152* (2013.01); *H04M 3/567* (2013.01); *H04N 7/147* (2013.01)

(58) Field of Classification Search
 CPC ........ H04M 3/567; H04N 7/152; H04N 7/147
 (Continued)

(56) References Cited

U.S. PATENT DOCUMENTS 5,689,641 A    11/1997  Ludwig et al.
6,317,776 B1 * 11/2001  Broussard ................ H04N 7/15
                                                          719/329
(Continued)

OTHER PUBLICATIONS

International Search Report for Application No. PCT/US2020/041033 dated Sep. 28, 2020. 2 Pages.

*Primary Examiner* — Melur Ramakrishnaiah
(74) *Attorney, Agent, or Firm* — Spencer Fane LLP; Steven J. Laureanti

(57) ABSTRACT

A system and method are disclosed for generating a teleconference space for two or more initial communication devices using a computer coupled with a database and comprising a processor and memory. The computer generates a teleconference space and transmits requests to join the teleconference space to the two or more initial communication devices. The computer stores in memory identification information, and audiovisual data associated with one or more users, for each of the two or more initial communication devices. The computer transmits audiovisual teleconference data to each of the two or more initial communication devices. The computer transmits a request to join the teleconference space to a third communication device, stores identification information and audiovisual data from the third communication device, and transmits audiovisual teleconference data that includes audiovisual data from the third communication device to each of the three or more communication devices.

11 Claims, 5 Drawing Sheets

Related U.S. Application Data

(60) Provisional application No. 62/871,507, filed on Jul. 8, 2019.

(58) Field of Classification Search
USPC .......................................... 348/14.01–14.16
See application file for complete search history.

(56) References Cited

U.S. PATENT DOCUMENTS

| | | | |
|---|---|---|---|
| 9,035,997 B2 | 5/2015 | Periyannan et al. | |
| 9,456,181 B2 | 9/2016 | Moorjani et al. | |
| 9,549,154 B1 | 1/2017 | Jehanno et al. | |
| 9,967,520 B1* | 5/2018 | Rensburg | H04L 12/1822 |
| 10,348,784 B2 | 7/2019 | Qian et al. | |
| 10,432,893 B2 | 10/2019 | Nace et al. | |
| 2007/0291108 A1 | 12/2007 | Huber et al. | |
| 2014/0226537 A1* | 8/2014 | Kashimba | H04L 65/4038 370/261 |
| 2015/0381932 A1* | 12/2015 | Louchheim | H04L 65/1083 348/14.07 |
| 2016/0094475 A1* | 3/2016 | Lynch | H04L 47/19 348/14.12 |
| 2017/0013235 A1* | 1/2017 | Jehanno | H04M 3/567 |
| 2017/0357915 A1 | 12/2017 | Holmes et al. | |

* cited by examiner

MULTI-DEVICE TELECONFERENCES

CROSS-REFERENCE TO RELATED APPLICATIONS

This application is a continuation of U.S. patent application Ser. No. 16/857,583, filed on Apr. 24, 2020, entitled "Multi-Device Teleconferences," which claims the benefit under 35 U.S.C. § 119(e) to U.S. Provisional Application No. 62/871,507, filed Jul. 8, 2019, and entitled "Multi-Device Teleconferences." U.S. patent application Ser. No. 16/857,583 and U.S. Provisional Application No. 62/871,507 are assigned to the assignee of the present application.

TECHNICAL FIELD

The present disclosure relates generally to electronic teleconferencing systems and more specifically to communication system joining and participating in ongoing audiovisual teleconferences using one or more communication devices.

BACKGROUND

Teleconference systems may utilize communication networks, including but not limited to the internet, to connect communication systems and communication devices such as computers, tablet computers, and/or smartphones. Teleconference systems may permit communication systems to share visual imagery and audio data associated with a speaking user with other communication systems. However, teleconference systems may not provide a speaking user, or other participating communication systems, with the ability to join the teleconference with additional communication devices without interrupting the teleconference or otherwise executing complicated and time-consuming teleconference joining and exit protocols.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to generate and support multi-device teleconferences. Embodiments of the disclosed subject matter include two or more initial communication systems, including but not limited to tablet computers or smartphones, and a computer coupled with a database and comprising a processor and memory. The computer generates a teleconference space and transmits requests to join the teleconference space to the two or more initial communication systems. The computer stores in memory identification information and audiovisual data transmitted by each of the two or more initial communication systems. The computer transmits audiovisual teleconference data to each of the two or more initial communication systems.

In embodiments of the disclosed subject matter, the computer transmits a request to join the teleconference space to a third communication system. The computer stores identification information and audiovisual data from the third communication system, and transmits audiovisual teleconference data that includes audiovisual data from the third communication system to each of the three or more communication systems.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
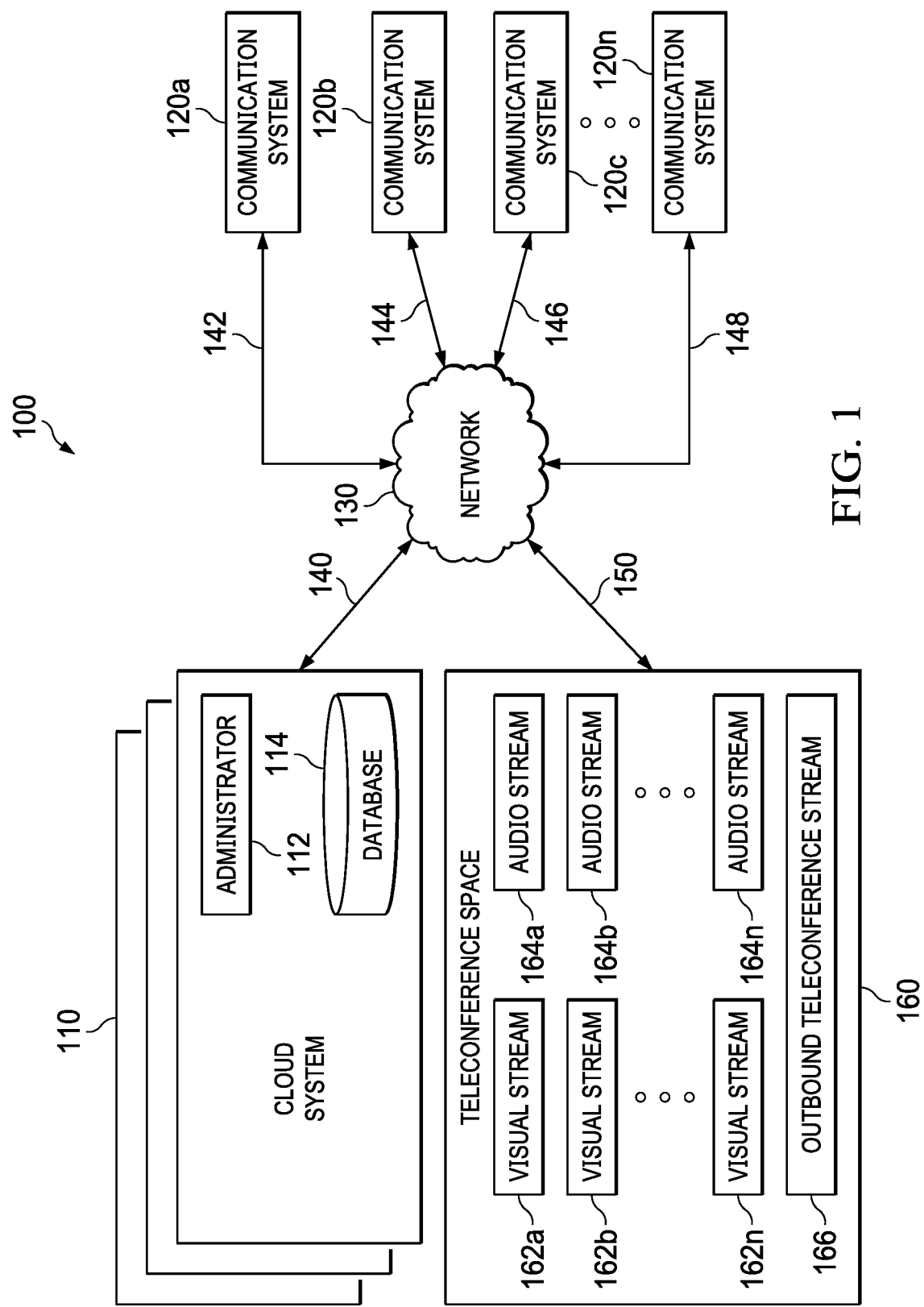
FIG. 1 illustrates an exemplary teleconference system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, embodiments of the following disclosure relate to conducting electronic audiovisual teleconferences using a plurality of communication systems. Embodiments of the following disclosure generate a teleconference space that includes a plurality of separate communication systems, each controlled by an individual user or group of users. Embodiments of the teleconference space comprise one or more visual streams, each of which may include video imagery, and one or more audio streams, which may comprise audio from a speaking user. Embodiments transmit these visual streams and audio streams as a single outbound teleconference stream to the plurality of separate communication systems, each of which displays the outbound teleconference stream to the one or more associated users using an audiovisual display device.

According to an aspect of the disclosure, embodiments permit a user associated with a particular communication system already participating in the teleconference space to join the teleconference space with one or more additional communication systems. Embodiments allow a user to switch from communication system to communication system while maintaining constant participation in the teleconference space, and to disconnect communication systems from the teleconference space while continuing to participate in the teleconference space with the one or more additional communication systems.

FIG. 1 illustrates exemplary teleconference system 100, according to a first embodiment. Teleconference system 100 comprises one or more cloud systems 110, one or more communication systems 120, network 130, communication links 140-150, and teleconference space 160. Although one or more cloud systems 110, communication systems 120*a*-120*n*, single network 130, communication links 140-150, and single teleconference space 160 are shown and described, embodiments contemplate any number of cloud systems 110, communication systems 120, networks 130, communication links 140-150, or teleconference spaces 160, according to particular needs.

In one embodiment, cloud system 110 comprises administrator 112 and database 114. Administrator 112 may generate teleconference space 160 in which one or more communication systems 120 participate. Database 114 comprises one or more databases 114 or other data storage arrangements at one or more locations local to, or remote from, cloud system 110. In one embodiment, one or more databases 114 is coupled with the one or more administrators 112 using one or more local area networks (LANs), metropolitan area networks (MANs), wide area networks (WANs), or aforementioned network 130, such as, for example, the Internet, or any other appropriate wire line, wireless link, or any other communication links 140-150. One or more databases 114 stores data that is made available to and may be used by one or more administrators 112 according to the operation of teleconference system 100 described below. According to embodiments, administrator 112 hosts and runs one or more runtime processes associated with cloud system 110.

According to embodiments, one or more users may be associated with each of one or more communication systems 120. Each of the one or more users may comprise, for example, an individual person or customer, one or more employees or teams of employees within a business, or any other individual, person, group of persons, business, or enterprise which communicates or otherwise interacts with one or more separate communication systems 120. Although an exemplary number of communication systems 120 are shown and described, embodiments contemplate any number of communication systems 120 interacting with network 130 and one or more cloud systems 110 according to particular needs. As an example only and not by way of limitation, teleconference system 100 may allow up to 50, 100, 500, or 1,000 separate communication systems 120 to join and participate in teleconference space 160 simultaneously.

Each of one or more communication systems 120 comprises one or more communication devices, such as, for example, cellular phones or smartphones, desktop computers, laptop computers, notebook computers, tablet-type devices, terminals, or any other communication device capable of receiving, transmitting, and displaying audiovisual information through network 130. In an embodiment, each of the one or more communication devices may comprise an audiovisual recording device, such as a computer camera and microphone, and an audiovisual display device, such as an electronic display screen and one or more speakers. The audiovisual display devices permit each of the one or more users interacting with each of the one or more communication devices to see and hear visual streams 162 and audio streams 164 of teleconference space 160. The audiovisual recording devices record audiovisual information regarding the one or more users associated with the one or more communication devices in the form of visual streams 162 and audio streams 164. In addition, each of the one or more communication devices may comprise an input device, such as a keyboard, mouse, or touchscreen.

Each of the one or more communication devices may comprise a processor, memory and data storage. The processor may execute an operating system program stored in memory to control the overall operation of the one or more communication devices associated with each of one or more communication systems 120. For example, the processor may control the reception of signals and the transmission of signals within teleconference system 100. The processor may execute other processes and programs resident in memory, such as, for example, registration, identification, or communication over the communication links 140-150, and moving data into or out of the memory, as required by an executing process.

Each of the one or more communication devices that comprise each of one or more communication systems 120 may be coupled with other communication devices, as well as one or more cloud systems 110, by network 130 via one or more communication links 140-150. Although communication links 142-148 are shown connecting each of one or more communication systems 120*a*-120*n*, respectively, to network 130, embodiments contemplate any number of communication links 140-150 connecting any number of communication systems 120 or communication devices with network 130, according to particular needs. In addition, or as an alternative, communication links 140-150 may connect one or more communication systems 120 and/or communication devices directly to one or more cloud systems 110 and/or one or more separate communication systems 120 and/or communication devices.

According to embodiments, one or more communication links 140-150 couple one or more cloud systems 110, including its administrator 112 and database 114, one or more communication systems 120, and teleconference space 160 generated by the one or more cloud administrators 112 with network 130. Each communication link 140-150 may comprise any wireline, wireless, or other link suitable to support data communications between one or more cloud systems 110, one or more communication systems 120, and/or teleconference space 160 and network 130. Although communication links 140-150 are shown as generally coupling one or more cloud systems 110, one or more communication systems 120, and teleconference space 160 with network 130, one or more cloud systems 110 and one or more communication systems 120 may communicate directly with each other according to particular needs.

According to embodiments, network 130 includes the Internet, telephone lines, any appropriate LANs, MANs, or WANs, and any other communication network coupling one or more cloud systems 110 and one or more communication systems 120. For example, data may be maintained by one or more cloud systems 110 at one or more locations external to one or more cloud systems 110, and made available to one or more cloud systems 110 or one or more communication systems 120 using network 130, or in any other appropriate manner.

According to embodiments, one or more cloud systems 110 and/or one or more communication systems 120 may each operate on one or more computers that are integral to or separate from the hardware and/or software that supports teleconference system 100. In addition, or as an alternative, the one or more users may be associated with teleconference system 100 including one or more cloud systems 110 and/or one or more communication systems 120. These one or more users may include, for example, one or more computers programmed to generate teleconference space 160 and permit communication systems 120 to join teleconference space 160 with one or more separate communication devices. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of teleconference system 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to teleconference system 100. The one or more computers also include one or more processors and associated memory to execute instructions and manipulate information according to the operation of teleconference system 100.

Embodiments contemplate one or more cloud systems 110 generating teleconference space 160. Each of the one or more communication devices may connect to one or more cloud systems 110 using network 130 and communication links 140-150, and may participate in teleconference space 160. Teleconference space 160 allows the one or more communication devices to conduct and participate in an audiovisual teleconference. Teleconference space 160 may comprise one or more visual streams 162 and/or one or more audio streams 164. Although FIG. 1 illustrates teleconference space 160 comprising a particular number of visual streams 162a-162n and audio streams 164a-164n, embodiments contemplate teleconference system 100 comprising any number of visual streams 162 and/or audio streams 164, according to particular needs.

Each visual stream 162 may comprise video imagery of one or more users associated with one or more communication devices, recorded by the communication devices' audiovisual recording devices (such as, for example, cameras). According to embodiments, visual stream 162 may comprise recorded video or stored images. Each audio stream 164 may comprise audio from one or more users associated with one or more communication devices, recorded by the communication devices' audiovisual recording devices (such as, for example, microphones). According to embodiments, audio stream 164 may comprise stored audio data.

According to embodiments, each of the one or more communication devices participating in teleconference space 160 may transmit audiovisual information, in the form of one or more visual streams 162 and one or more audio streams 164, to cloud system 110 administrator 112. Cloud system 110 administrator 112 generates outbound teleconference stream 166, comprising one or more selected visual streams 162 and/or audio streams 164, and transmits outbound teleconference stream 166 to each of the one or more communication devices participating in teleconference space 160. Each of the one or more communication devices uses an associated audiovisual display devices to display outbound teleconference stream 166.

Cloud system 110 administrator 112 may permit users to join teleconference space 160 with multiple communication devices at different points in the teleconference. For example, after having joined teleconference space 160 using a specific communication device (such as, for example, a desktop computer) to transmit visual stream 162 and audio stream 164 to cloud system 110 administrator 112, a particular user may subsequently join teleconference space 160 with a second communication device (such as, for example, a smartphone), which may transmit second visual stream 162 and second audio stream 164 to cloud system 110 administrator 112. According to embodiments, cloud system 110 administrator 112 may choose to incorporate either audio stream 164 from the desktop computer or audio stream 164 from the smartphone, or both audio streams 164, and either or both of the two visual streams 162, into outbound teleconference stream 166, according to embodiments. The above example is provided for illustrative purposes only, and embodiments contemplate any number of users joining and participating in teleconference space 160 using one or more separate communication devices, as described in greater detail below.

Figure 2:
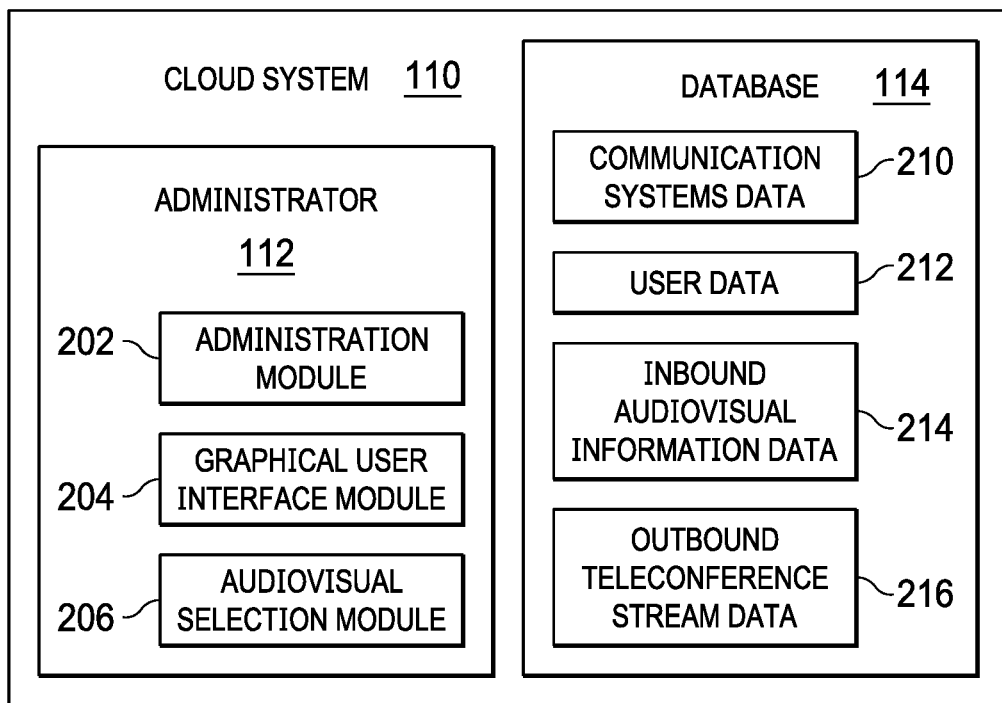
FIG. 2 illustrates the cloud system of FIG. 1 in greater detail, according to an embodiment.

FIG. 2 illustrates cloud system 110 of FIG. 1 in greater detail, according to an embodiment. As discussed above, cloud system 110 may comprise one or more computers at one or more locations including associated input devices, output devices, non-transitory computer-readable storage media, processors, memory, or other components to send and receive information between one or more communication systems 120 and/or one or more communication devices according to the operation of teleconference system 100. In addition, cloud system 110 comprises administrator 112 and database 114. Although cloud system 110 is described as comprising a single administrator 112 and database 114, embodiments contemplate any suitable number of administrators 112 or databases 114 internal to or externally coupled with cloud system 110. In addition, or as an alternative, cloud system 110 may be located internal to one or more communication devices. For example, cloud system 110 may be located external to one or more communication devices and may be located in, for example, a corporate or regional entity of one or more communication systems 120, according to particular needs.

According to embodiments, administrator 112 comprises administration module 202, graphical user interface module 204, and audiovisual selection module 206. Although a particular configuration of administrator 112 is shown and described, embodiments contemplate any suitable number or combination of administration modules 202, graphical user interface modules 204, and/or audiovisual selection modules 206 located at one or more locations, local to, or remote from, cloud system 110, according to particular needs. In addition, or as an alternative, administration module 202, graphical user interface module 204, and audiovisual selection module 206 may be located on multiple administrators 112 or computers at any location in teleconference system 100.

Database 114 may comprise communication systems data 210, user data 212, inbound audiovisual information data 214, and outbound teleconference stream data 216. Although database 114 is shown and described as comprising communication systems data 210, user data 212, inbound audiovisual information data 214, and outbound teleconference stream data 216, embodiments contemplate any suitable number or combination of communication systems data 210, user data 212, inbound audiovisual information data 214, outbound teleconference stream data 216, and/or other data pertaining to teleconference system 100 located at one or more locations, local to, or remote from, cloud system 110, according to particular needs.

Administration module 202 of administrator 112 may configure, update, and/or manage the operation of cloud system 110. That is, administration module 202 may configure, update, and/or manage the broader operation of teleconference system 100 and change which data is executed and/or stored on one or more cloud systems 110 and/or one or more communication devices. Teleconference system 100 may comprise a user-configurable system, such that cloud system 110 administrator 112 may store communication systems data 210, user data 212, inbound audiovisual information data 214, and/or outbound teleconference stream data 216 either singularly or redundantly in cloud system 110 database 114 and/or one or more communication devices, according to particular needs. According to other embodiments, administration module 202 monitors, processes, updates, creates, and stores communication systems data 210, user data 212, inbound audiovisual information data 214, and/or outbound teleconference stream data 216 in cloud system 110 database 114.

According to embodiments, administration module 202 of administrator 112 may generate teleconference space 160, which one or more communication devices may join. When a communication device joins teleconference space 160, administration module 202 may record unique identifying information regarding the communication device, such as by assigning the communication device a unique ID or by recording the communication device's IP or MAC address, in communication systems data 210 of database 114. Administration module 202 may use information stored in communication systems data 210 to identify a specific user associated with the particular communication device, and may store the user-identifying information in user data 212 of database 114.

Graphical user interface module 204 of administrator 112 generates outbound teleconference stream 166, which administration module 202 transmits to the one or more communication devices using network 130 and one or more communication links 140-150. In an embodiment, graphical user interface module 204 accesses outbound teleconference stream data 216, stored in database 114, and uses outbound teleconference stream data 216 to generate outbound teleconference stream 166. Administration module 202 transmits outbound teleconference stream 166 to the one or more communication devices participating in teleconference space 160. Graphical user interface module 204 stores and retrieves data from cloud system 110 database 114 including communication systems data 210, user data 212, inbound audiovisual information data 214, and outbound teleconference stream data 216, in the process of generating outbound teleconference stream 166. Graphical user interface module 204 may generate different graphical user interface displays conveying different types of information for different communication devices.

Audiovisual selection module 206 of administrator 112 determines which of the one or more visual streams 162 and/or audio streams 164, stored in inbound audiovisual information data 214, will comprise outbound teleconference stream 166. According to embodiments, audiovisual selection module 206 selects one or more visual streams 162 and/or audio streams 164 from inbound audiovisual information data 214, and copies the selected visual streams 162 and/or audio streams 164 to outbound teleconference stream data 216. Graphical user interface module 204 accesses outbound teleconference stream data 216, and uses visual streams 162 and/or audio streams 164 stored in outbound teleconference stream data 216 to generate outbound teleconference stream 166.

Communication systems data 210 of database 114 contains the identification information of one or more communication devices. Identification information may comprise, for example, information regarding the operating systems of each of the one or more communication devices, internet browser information regarding each of the one or more communication devices, or communication device system specifications (such as, for example, processor speed, available memory, hard drive space, and the like). Communication systems data 210 may also include end user ID information, end user personal identification number (PIN) information, communication device ID information, communication device MAC address information, or any other type of information which cloud system 110 may use to identify and track each of the one or more communication devices participating in teleconference system 100. Communication systems data 210 may also include user account information that associates one or more communication devices with one or more specific users.

Although particular communication systems data 210 is described, embodiments contemplate any type of communication systems data 210 associated with one or more communication devices, according to particular needs. In one embodiment, cloud system 110 uses communication systems data 210 to identify one or more participating communication devices in teleconference system 100 in order to aid the selection of one or more communication device streams to comprise outbound teleconference stream 166, such as by prioritizing the communication device streams of predetermined very important person (VIP) communication devices.

User data 212 of database 114 comprises information regarding one or more users who may utilize one or more communication devices to join and participate in teleconference space 160. Administration module 202 may store information in user data 212 that tracks each of the one or more users participating in teleconference space 160 across each of the one or more communication devices which may be associated with each user. That is, a single user may be associated with one or more separate communication devices participating in teleconference space 160, and administration module 202 may access communication systems data 210 and/or user account information stored within communication systems data 210 to associate one or more communication devices with a particular user.

User data 212 may comprise names and addresses of the one or more users associated with each of the one or more communication devices, company contact information, telephone numbers, email addresses, IP addresses, and the like. User data 212 may comprise user account information, which may associate user name information, address information, and other identifying information, as well as one or more communication devices associated with or registered to a particular user, with a particular user.

Inbound audiovisual information data 214 of database 114 comprises visual streams 162 and audio streams 164 transmitted to cloud system 110 from each of the one or more communication devices participating in teleconference space 160. As described in greater detail below, administration module 202 may generate teleconference space 160, which one or more communication devices may join. Each of the one or more communication devices may transmit visual stream 162 and audio stream 164, recorded by the communication device's audiovisual recording device, to administration module 202. Administration module 202 may use information stored in communication systems data 210 and user data 212 to associate each incoming visual and audio stream 164 with a particular communication device and user, and may store information regarding each incoming visual and audio stream 164 in inbound audiovisual information data 214 of database 114.

Outbound teleconference stream data 216 of database 114 comprises one or more selected visual streams 162 and audio streams 164 which will comprise outbound teleconference stream 166. According to embodiments, audiovisual selection module 206 selects, from visual streams 162 and audio streams 164 stored in inbound audiovisual information data 214, one or more visual streams 162 and audio streams 164 to comprise outbound teleconference stream 166. Audiovisual selection module 206 stores the selected one or more visual streams 162 and audio streams 164 in outbound teleconference stream data 216. Graphical user interface module 204 accesses outbound teleconference stream data 216 and generates outbound teleconference stream 166, which administration module 202 transmits to the one or more communication devices using network 130 and the communication links 140-150.

Figure 3:
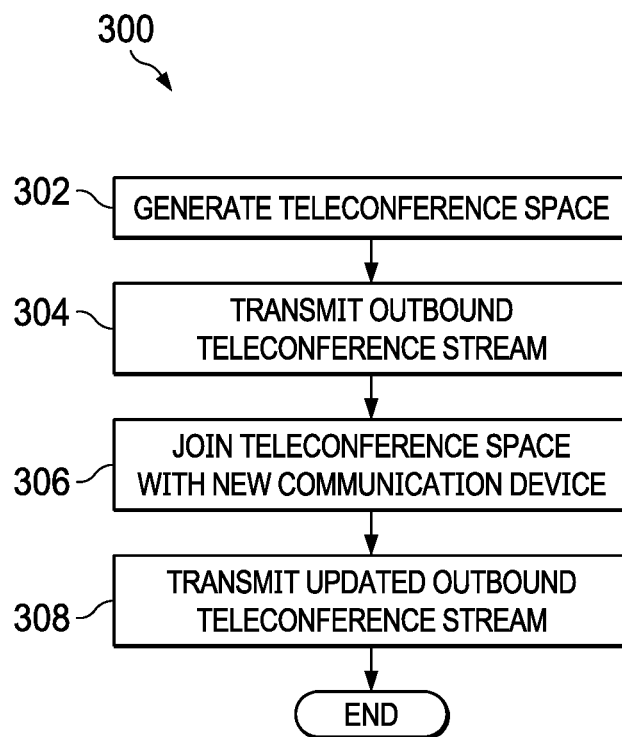
FIG. 3 illustrates an exemplary method of joining and participating in a teleconference space using a plurality of communication devices, according to an embodiment.

FIG. 3 illustrates exemplary method 300 of joining and participating in teleconference space 160 using a plurality of communication devices, according to an embodiment. Method 300 of joining and participating in teleconference space 160 using a plurality of communication devices proceeds by one or more actions, which although described in a particular order may be performed in one or more permutations or alternative orders, according to particular needs.

At action 302 of method 300, teleconference system 100 generates teleconference space 160. In an embodiment, administration module 202 of cloud system 110 administrator 112 may receive a request, transmitted by one or more communication devices, to generate teleconference space 160. Administration module 202 generates teleconference space 160 and transmits, using network 130, requests to join teleconference space 160 to one or more communication devices. Each communication device transmits its acceptance of the request to join teleconference space 160 to administration module 202. Administration module 202 records unique identifying information regarding each communication device, such as by assigning each communication device a unique ID and by recording the IP or MAC address of each communication device, in communication systems data 210. In an embodiment, administration module 202 may record unique user-identifying information regarding the users associated with each communication device in user data 212. Each communication device participating in teleconference space 160 records, using its associated audiovisual recording device, visual stream 162 and audio stream 164 displaying the one or more users associated with the particular communication device. Each communication device transmits this visual stream 162 and audio stream 164 to administration module 202, using network 130 and communication links 140-150. Administration module 202 associates each incoming visual stream 162 and each incoming audio stream 164 with a particular communication device and user by accessing information stored in communication systems data 210 and user data 212 of database 114. Administration module 202 stores each visual stream 162 and each audio stream 164 in inbound audiovisual information data 214 of database 114.

At action 304, cloud system 110 transmits outbound teleconference stream 166. Audiovisual selection module 206 of administrator 112 accesses visual streams 162 and audio streams 164 stored in inbound audiovisual information data 214 and determines which of visual streams 162 and audio streams 164 will comprise outbound teleconference stream 166. According to embodiments, audiovisual selection module 206 may use any method to select one or more visual streams 162 and/or audio streams 164 to comprise outbound teleconference stream 166. Audiovisual selection module 206 stores selected visual streams 162 and audio streams 164 in outbound teleconference stream data 216. Graphical user interface module 204 accesses one or more visual streams 162 and one or more audio streams 164 stored in outbound teleconference stream data 216, and uses outbound teleconference stream data 216 to generate outbound teleconference stream 166. Administration module 202 transmits outbound teleconference stream 166 to the one or more communication devices participating in teleconference space 160. Each of the one or more communication devices displays the audiovisual content of outbound teleconference stream 166 using an associated audiovisual display device.

Figure 7:
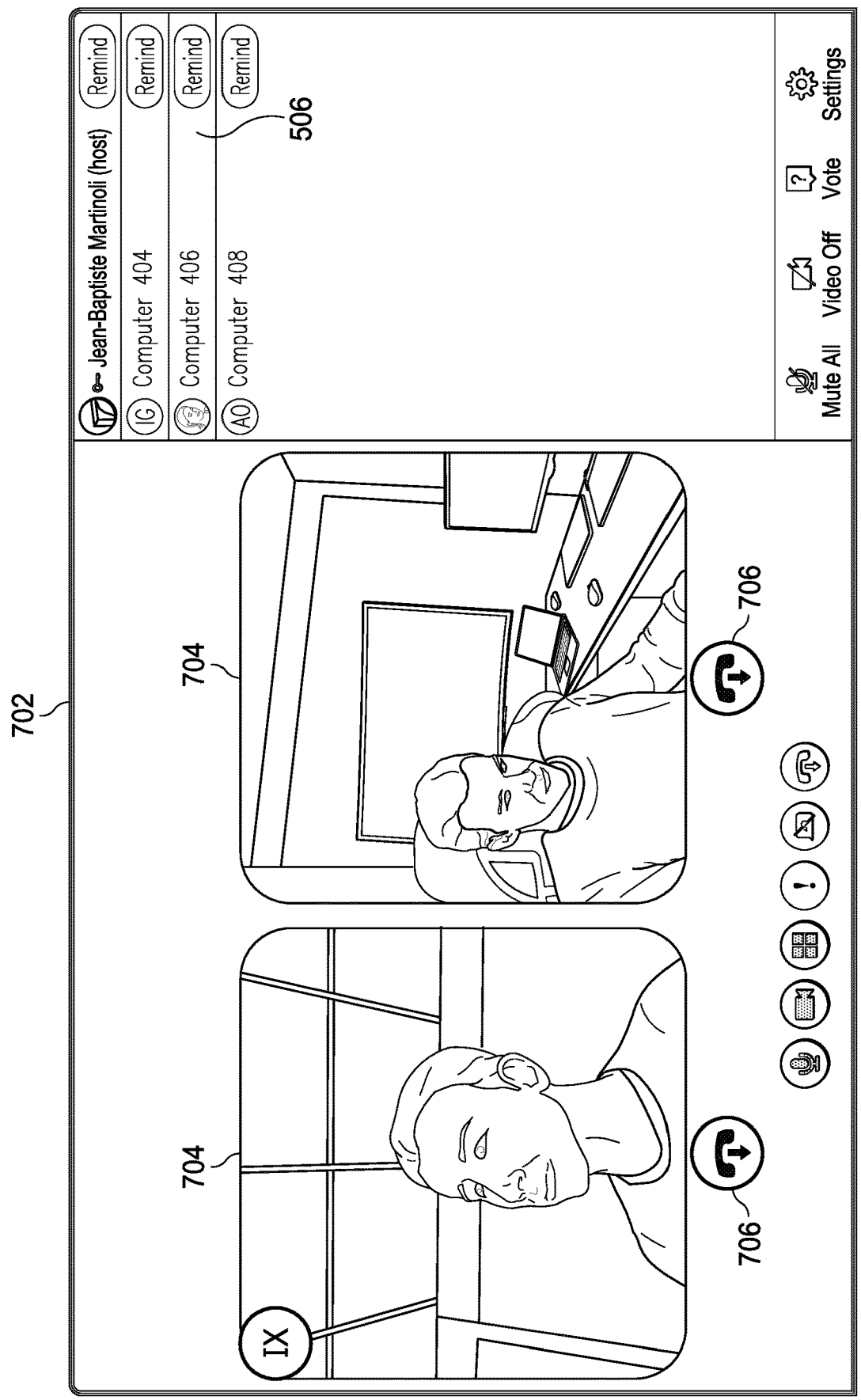
FIG. 7 illustrates an updated outbound teleconference stream display, according to an embodiment.

At action 306, one or more users associated with one or more communication devices joins teleconference space 160 with a new teleconference device. Embodiments contemplate users joining teleconference space 160 with new communication devices to, for example, switch visual streams 162 comprising outbound teleconference stream 166 from a stationary communication device (such as a computer) to a mobile communication device (such as a smartphone) to enable the user to move to a new location and to transmit one or more visual streams 162 to the one or more separate communication devices that would have been out of the visual field of the stationary communication device's audiovisual recording device. Other embodiments contemplate a user transmitting multiple visual streams 162 from multiple communication devices in a single outbound teleconference stream 166, as illustrated by FIG. 7. Further embodiments contemplate a user beginning a teleconference space 160 teleconference presentation using a first communication device, joining the teleconference presentation with a second communication device without interrupting the ongoing teleconference presentation, and disconnecting the first communication device from teleconference space 160 while continuing the teleconference presentation using the second communication device.

In an embodiment, to perform action 306, a communication device participating in teleconference space 160 transmits a request to administration module 202, using network 130 and communication links 140-150, to join the in-process teleconference space 160 with a new and separate communication device. Administration module 202 accepts the request, and the new communication device joins teleconference system 100 and the in-process teleconference space 160. Administration module 202 records unique identifying information regarding the new communication device, such as by assigning the new communication device a unique ID and by recording the IP or MAC address of the new communication device, in communication systems data 210. Administration module 202 may record records unique user-identifying information regarding the one or more users associated with the new communication device in user data 212. In other embodiments, administration module 202 may transmit requests to join teleconference space 160 to one or more communication devices directly.

At action 308, cloud system 110 transmits updated outbound teleconference stream 160. Audiovisual selection module 206 of administrator 112 accesses visual streams 162 and audio streams 164 (including new visual stream 162 and new audio stream 164 transmitted from the new communication device) stored in inbound audiovisual information data 214. Audiovisual selection module 206 determines which of visual streams 162 and audio streams 164 will comprise updated outbound teleconference stream 166. According to embodiments, audiovisual selection module 206 may use any method to select one or more visual streams 162 and/or audio streams 164 to comprise updated outbound teleconference stream 166. Audiovisual selection module 206 stores selected updated visual streams 162 and updated audio streams 164 in outbound teleconference stream data 216. Graphical user interface module 204 accesses one or more updated visual streams 162 and one or more updated audio streams 164 stored in outbound teleconference stream data 216, and uses outbound teleconference stream data 216 to generate updated outbound teleconference stream 166. Administration module 202 transmits updated outbound teleconference stream 166 to the one or more communication devices participating in teleconference space 160. Each of the one or more communication devices displays the audiovisual content of updated outbound teleconference stream 166 using an associated audiovisual display device. Teleconference system 100 terminates method 300 when the communication devices disconnect from teleconference space 160.

The following example illustrates the operation of joining and participating in teleconference space 160 using a plurality of communication devices. In this example, exemplary teleconference system 100 initially comprises cloud system 110, four communication devices (comprising computers 402-408), network 130, and five communication links 140-148. Although a particular number of cloud systems 110, computers 402-408, networks 130, and communication links 140-148 are shown and described, embodiments contemplate any number of cloud systems 110, communication devices, networks 130, or communication links 140-150, according to particular needs.

Figure 4:
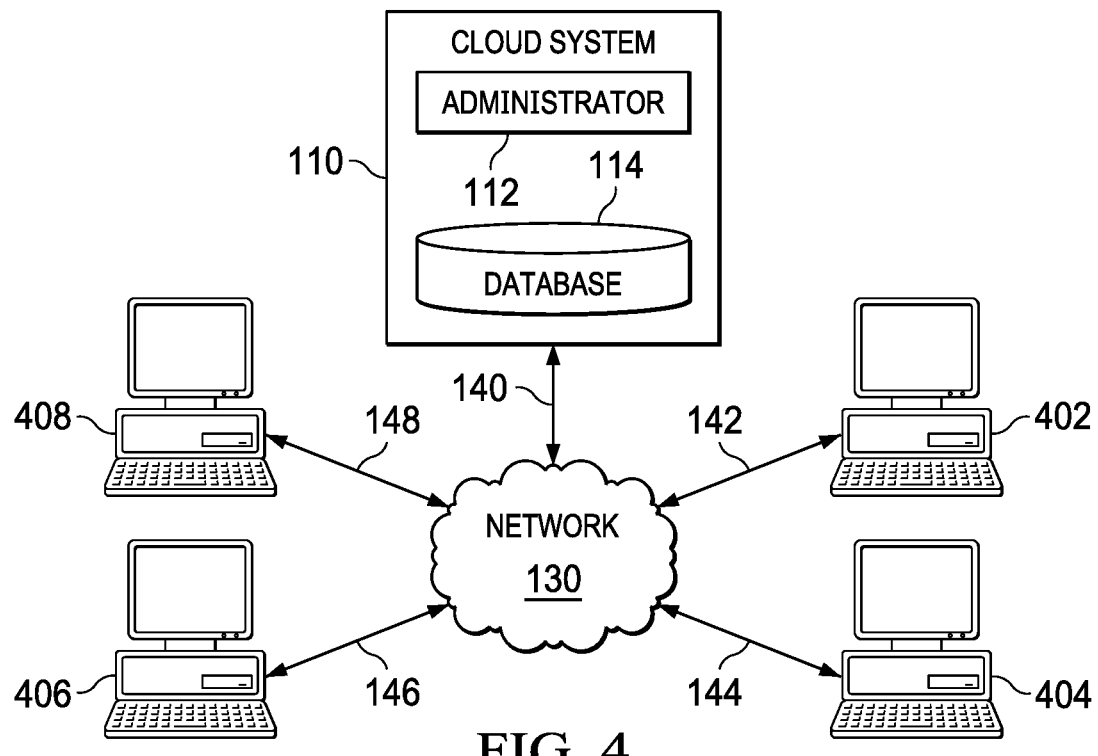
FIG. 4 illustrates an exemplary teleconference system executing the method of FIG. 3, according to an embodiment.

FIG. 4 illustrates exemplary teleconference system 100 executing method 300 of FIG. 3, according to an embodiment. In this example, each of computers 402-408 comprises an audiovisual recording device (comprising a camera and microphone), an audiovisual display device (comprising an electronic display screen and one or more speakers), and an input device (comprising a keyboard). In this example, a single user is associated with each of computers 402-408. For the purposes of this example, the user associated with computer 402 (henceforth, "User A") utilizes computer 402 to deliver an audiovisual presentation to the users of computers 404-408 using teleconference space 160. In other embodiments not illustrated by this ongoing example, any number of users may be associated with each participating communication device, and any number of users may participate in an audiovisual presentation using teleconference space 160.

Continuing the example, at action 302, User A uses computer 402 to transmit a request to administration module 202, using network 130 and communication links 140-142, to generate teleconference space 160. Administration module 202 generates teleconference space 160 and transmits, using network 130, requests to join teleconference space 160 to each of computers 402-408. Each of computers 402-408 transmits acceptance of the request to join teleconference space 160 to administration module 202. Administration module 202 records unique identifying information regarding each of computers 402-408, such as by assigning each of computers 402-408 a unique ID and by recording the IP or MAC address of each of computers 402-408, in communication systems data 210. Similarly, administration module 202 records unique user-identifying information regarding the users associated with each of computers 402-408 in user data 212.

Continuing the example, each of computers 402-408 participating in teleconference space 160 records, using an associated audiovisual recording device, visual stream 162 and audio stream 164 displaying the user associated with each of computers 402-408. Each of computers 402-408 transmits visual stream 162 and audio stream 164 to administration module 202, using network 130 and communication links 140-148. Administration module 202 associates each incoming visual stream 162 and audio stream 164 with a particular communication device and user by accessing information stored in communication systems data 210 and user data 212 of database 114. Administration module 202 stores each visual stream 162 and each audio stream 164 in inbound audiovisual information data 214 of database 114.

Continuing the example, at action 304, audiovisual selection module 206 of administrator 112 accesses visual streams 162 and audio streams 164 stored in inbound audiovisual information data 214 and determines which of visual streams 162 and audio streams 164 will comprise outbound teleconference stream 166. In this example, User A requested the generation of teleconference space 160 to deliver an audiovisual presentation to the users of the other three computers, and audiovisual selection module 206 therefore selects visual streams 162 and audio streams 164 of User A computer 402 to comprise outbound teleconference stream 166. Audiovisual selection module 206 stores visual streams 162 and audio streams 164 transmitted by User A computer 402 in outbound teleconference stream data 216. In other embodiments, audiovisual selection module 206 may use any means to select which of visual streams 162 and audio streams 164 stored in inbound audiovisual information data 214 will comprise outbound teleconference stream 166, including but not limited to selecting visual streams 162 and audio streams 164 of one or more predefined very important person (VIP) users.

Continuing the example, graphical user interface module 204 accesses visual streams 162 and audio streams 164 stored in outbound teleconference stream data 216, and uses outbound teleconference stream data 216 to generate outbound teleconference stream 166. In this example, outbound teleconference stream 166 comprises visual streams 162 and audio streams 164 transmitted by User A computer 402. Administration module 202 transmits outbound teleconference stream 166 to each of computers 402-408 participating in teleconference space 160. Each of computers 402-408 displays, on an associated audiovisual display device, the audiovisual content of outbound teleconference stream 166 in the form of outbound teleconference stream display 502.

Figure 5:
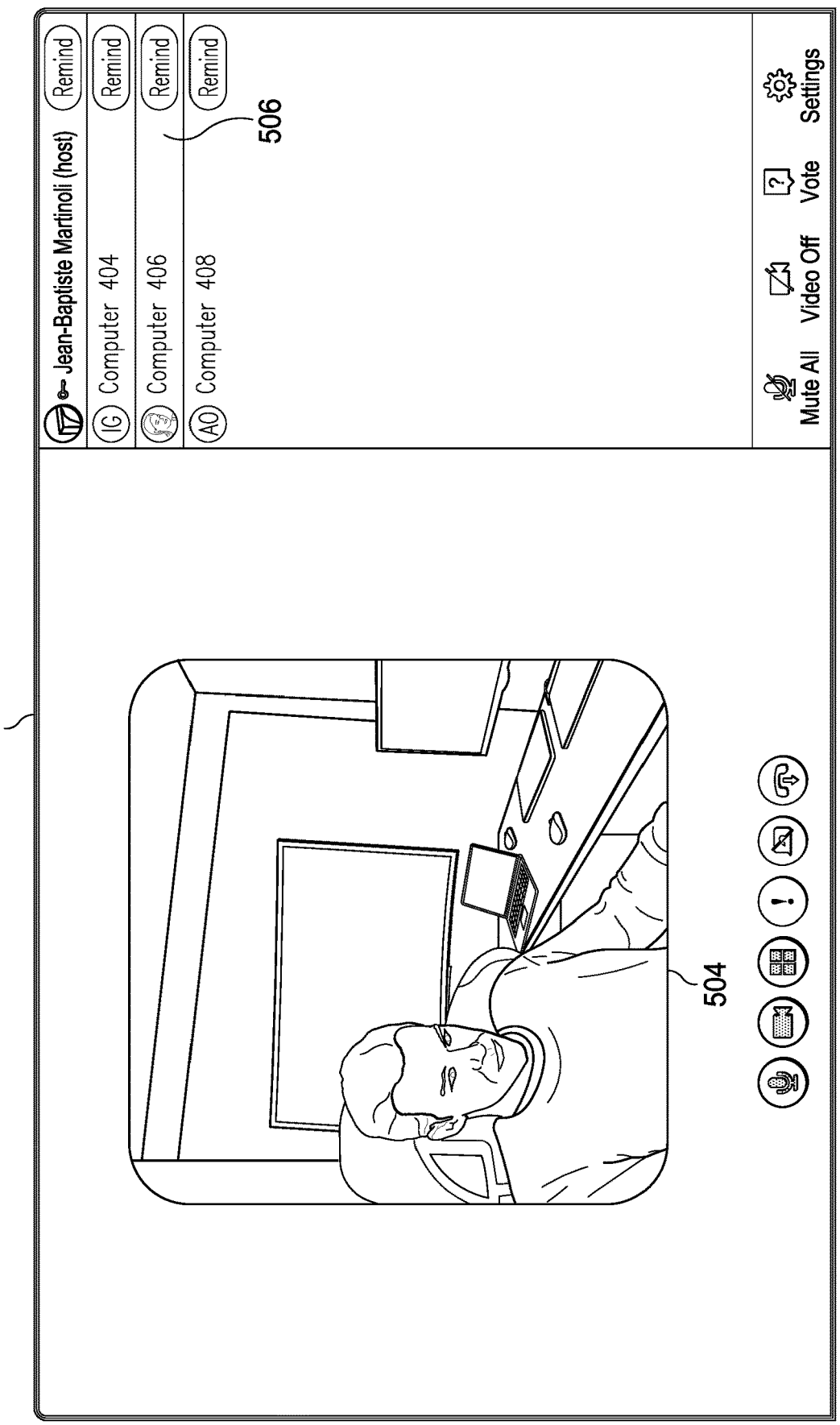
FIG. 5 illustrates an outbound teleconference stream display, according to an embodiment.

FIG. 5 illustrates outbound teleconference stream display 502, according to an embodiment. In an embodiment, outbound teleconference stream display 502 may comprise presentation window 504 and participant panel 506. Although FIG. 5 illustrates outbound teleconference stream display 502 in a particular configuration, embodiments contemplate outbound teleconference stream displays 502 of any configuration, according to particular needs. Presentation window 504, occupying a large area of the central portion of outbound teleconference stream display 502 illustrated in FIG. 5, displays visual stream 162 of outbound teleconference stream 166, which in this example comprises live video imagery of User A giving the teleconference presentation. Although a particular presentation window 504 configuration is shown and described, embodiments contemplate outbound teleconference streams 166 displaying visual streams 162 and/or presentation windows 504 in any configuration, according to particular needs.

According to embodiments, participant panel 506 on the right side of outbound teleconference stream 166 illustrated in FIG. 5 displays a visual representation of the communication devices currently participating in teleconference space 160. Participant panel 506 may identify these participants by the names of the users associated with the separate communication devices, or by identifying the communication devices themselves (such as "iPhone X," "Acer One," and the like). In an embodiment, administration module 202 may assign names to the separate communication devices displayed in participant panel 506 using information contained in communication systems data 210. Continuing the above example, participant panel 506 of exemplary outbound teleconference stream display 502 lists the four participating communication devices (in this example, computers 402-408). Although a particular participant panel 506 configuration is shown and described, embodiments contemplate outbound teleconference stream displays 502 displaying participant panels 506 in any configuration, according to particular needs.

Continuing the example, at action 306, User A chooses to join teleconference space 160 with a new communication device (in this example, smartphone 602). Although this example describes User A participating in teleconference space 160 with computer 402 and smartphone 602, embodiments contemplate users participating in teleconference spaces 160 with any number and any type of communication devices, according to particular needs.

Continuing the example, at action 306, User A uses associated smartphone 602 to transmit a request to administration module 202, using network 130 and communication link 149, to join teleconference space 160 in-process. Administration module 202 accepts the request, and smartphone 602, associated with User A, joins the exemplary teleconference system 100 and the in-process teleconference space 160. Administration module 202 records unique identifying information regarding smartphone 602, such as by assigning smartphone 602 a unique ID and by recording the IP or MAC address of smartphone 602, in communication systems data 210. Similarly, administration module 202 records unique user-identifying information regarding User A associated with smartphone 602 in user data 212.

Figure 6:
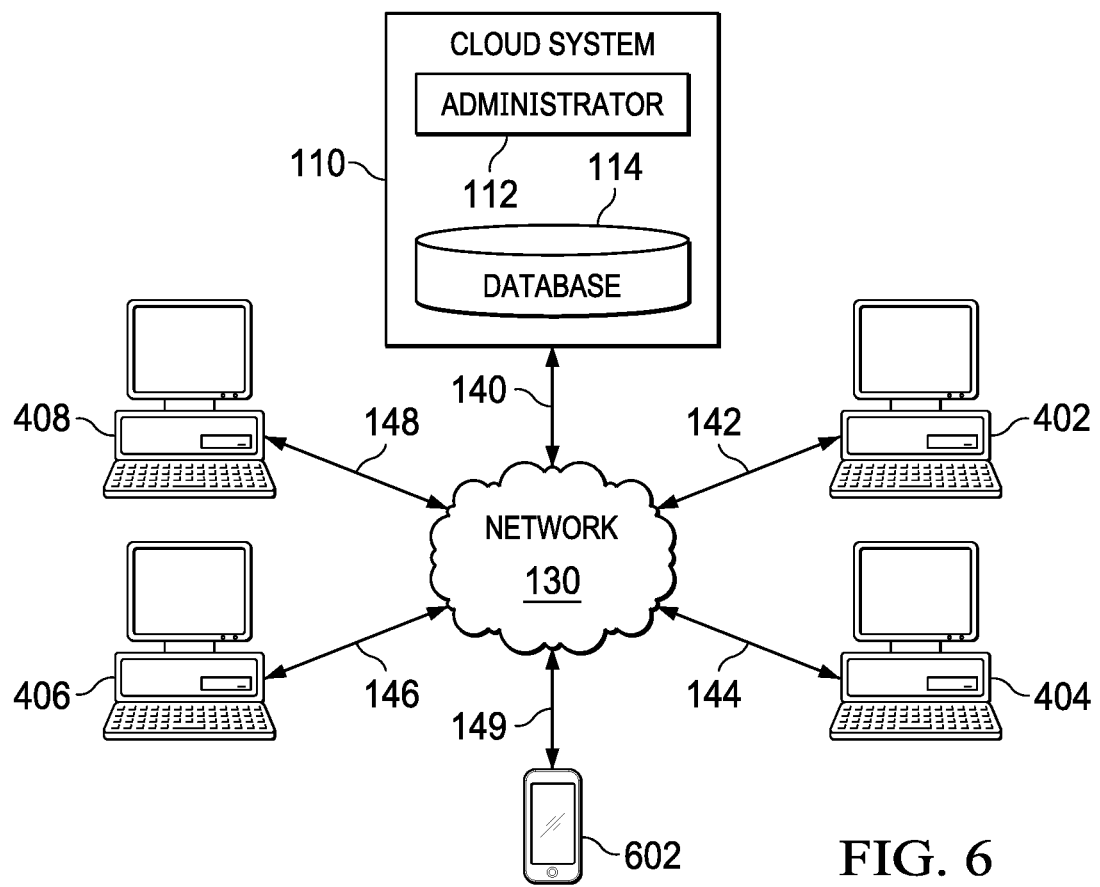
FIG. 6 illustrates the exemplary teleconference system executing the method of FIG. 3 after a user has joined the teleconference system with a smartphone, according to an embodiment.

FIG. 6 illustrates exemplary teleconference system 100 executing method 300 of FIG. 3 after User A has joined teleconference system 100 with smartphone 602, according to an embodiment. Teleconference system 100 now comprises cloud system 110, computers 402-408, each of which is associated with a particular user (with computer 402 associated with User A), and smartphone 602, associated with User A. Smartphone 602 comprises an audiovisual recording device (comprising a camera and microphone), an audiovisual display device (comprising an electronic display screen and one or more speakers), and an input device (comprising a keyboard). Each of computers 402-408 participating in teleconference space 160, and smartphone 602, records visual stream 162 and audio stream 164 displaying the user associated with the particular communication device. Each communication device transmits visual stream 162 and audio stream 164 to administration module 202, using network 130 and communication links 140-159. Administration module 202 associates each incoming visual stream 162 and audio stream 164 with a particular communication device and user by accessing information stored in communication systems data 210 and user data 212 of database 114, and stores each visual stream 162 and each audio stream 164 in inbound audiovisual information data 214 of database 114.

Continuing the example, at action 308, audiovisual selection module 206 of administrator 112 accesses visual streams 162 and audio streams 164 stored in inbound audiovisual information data 214 and determines which of visual streams 162 and audio streams 164 will now comprise outbound teleconference stream 166. In this particular example, audiovisual selection module 206 again selects visual streams 162 and audio streams 164 associated with User A to comprise outbound teleconference stream 166. As there are now two sets of visual streams 162 and audio streams 164 associated with User A communication devices stored in inbound audiovisual information data 214 (more specifically, computer 402 visual stream 162 and audio stream 164, and smartphone 602 visual stream 162 and audio stream 164), audiovisual selection module 206 selects, in this example, both visual streams 162, and the louder of the two audio streams 164 (which in this example comprises audio stream 164 from smartphone 602), to comprise updated outbound teleconference stream 166.

In other embodiments not illustrated by the continuing example, audiovisual selection module 206 may utilize one or more other criteria to select which of visual streams 162 and audio streams 164 will comprise outbound teleconference stream 166. For example, where a particular user is associated with multiple communication devices, each of which transmits a separate visual stream 162 to administration module 202, audiovisual selection module 206 may combine all visual streams 162 into outbound teleconference stream 166. In addition, or as an alternative, audiovisual selection module 206 may choose visual stream 162 transmitted by the communication device associated with a particular user that most recently joined teleconference space 160. In other embodiments in which a particular user participates in teleconference space 160 using multiple communication devices, the user may manually select which communication device's visual stream 162 will be selected by audiovisual selection module 206 to comprise outbound teleconference stream 166.

Audiovisual selection module 206 may utilize similar criteria to select which of one or more audio streams 164 transmitted by communication devices associated with a particular user will comprise outbound teleconference stream 166. For example, according to embodiments, audiovisual selection module 206 may select the loudest or most clear audio stream 164 transmitted by a communication device associated with a particular user to comprise outbound teleconference stream 166. In addition, or as an alternative, the user may manually select which communication device's audio stream 164 will be selected by audiovisual selection module 206 to comprise outbound teleconference stream 166.

Continuing the example, and having selected both visual streams 162, and smartphone 602 audio stream 164, associated with User A to comprise updated outbound teleconference stream 166, audiovisual selection module 206 stores visual streams 162 and audio stream 164 in outbound teleconference stream data 216 of database 114. Graphical user interface module 204 accesses visual streams 162 and audio streams 164 stored in outbound teleconference stream data 216, and uses outbound teleconference stream data 216 to generate updated outbound teleconference stream 166. Administration module 202 transmits updated outbound teleconference stream 166 to the communication devices participating in teleconference space 160. Each communication device displays, on an associated audiovisual display device the audiovisual content of updated outbound teleconference stream 166 in the form of updated outbound teleconference stream display 702.

FIG. 7 illustrates updated outbound teleconference stream display 702, according to an embodiment. Continuing the example, updated outbound teleconference stream display 702 displays presentation windows 704 and participant panel 506. Presentation windows 704 display both visual streams 162 (comprising computer 402 visual stream 162 and smartphone 602 visual stream 162) which in this example comprise updated outbound teleconference stream 166. Although not illustrated in FIG. 7, updated outbound teleconference stream display 702 also comprises audio stream 164 transmitted to administration module 202 by smartphone 602.

As illustrated in FIG. 7, updated outbound teleconference stream display 702 may further comprise hang-up buttons 706 associated with each of visual streams 162 which comprise presentation windows 704. Hang-up buttons 706, illustrated in FIG. 7 as white circles containing red telephone hang-up icons, allow User A to disconnect one or more visual streams 162 (and the communication devices transmitting the one or more visual streams 162) from teleconference space 160 without interrupting the ongoing teleconference presentation or visual streams 162 and audio streams 164 transmitted by the other communication devices associated with User A. User A may thus begin a teleconference presentation using a first communication device, join the ongoing teleconference presentation with a second communication device, and use hang-up button 706 associated with the first communication device to disconnect the first communication device from the teleconference presentation, all while continuing the teleconference presentation using visual streams 162 and audio streams 164 of the second communication device. Although a particular hang-up button 706 configuration is shown and described, embodiments contemplate any number of outbound teleconference stream display 502 hang-up button 706 configurations, or updated outbound teleconference stream display 702 hang-up button 706 configurations, according to particular needs. Concluding the example, teleconference system 100 terminates method 300 when all communication devices disconnect from teleconference space 160.

Embodiments contemplate any user associated with any communication device joining and participating in teleconference space 160 with one or more new communication devices. Embodiments allow any user to switch from communication device to communication device while maintaining constant participation in teleconference space 160, and to disconnect communication devices from teleconference space 160 while continuing to participate in teleconference space 160 with the one or more additional communication devices.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
two or more communication devices each identified with two or more users; and
a computer coupled with a database and comprising a processor and memory, the computer configured to generate a teleconference space in which the two or more communication devices participate by:
generating a teleconference space;
transmitting requests to join the teleconference space to the two or more communication devices;
storing in the computer memory identification information for each of the two or more communication devices;
storing received audiovisual data comprising an audio stream and a visual stream associated with the two or more users associated with each of the two or more communication devices;
generating a graphical user interface for each of the two or more communication devices for displaying an outbound teleconference stream of the audiovisual data, wherein the graphical user interface further comprises:
a selectable hang-up button associated with each displayed visual stream, wherein when selected, the hang-up button disconnects its associated visual stream without interrupting a current presentation in the teleconference space;
one or more selectable graphical elements for controlling the teleconference space;
a presentation window displaying each of the visual streams transmitted to the participating user; and
a participant panel displaying a visual representation of communication devices currently participating in the teleconference space;
selecting, based on criteria, an audio stream and one or more visual streams from the received audiovisual data to transmit as the outbound teleconference stream;
combining the selected audio stream and the selected one or more visual streams for the outbound teleconference stream;
transmitting the outbound teleconference stream for display on each of the two or more communication devices;
joining the teleconference space by a participating user with an additional communication device;
combining the visual stream of the additional communication device with one or more existing visual streams of the participating user; and
displaying the combined visual streams on a graphical user interface of the participating user.

2. The system of claim 1, wherein the criteria for the selecting further comprises:
a visual stream transmitted by a communication device associated with a particular user that most recently joined the teleconference space;

a loudest or most clear audio stream transmitted by a communication device associated with a particular user;
a manual selection of a visual stream from a single communication device where a user participates in the teleconference space using multiple communication devices;
a manual selection of an audio stream from a single communication device where a user participates in the teleconference space using multiple communication devices; or
a combination of visual streams from multiple communication devices of a particular user.

3. The system of claim 1, further comprising:
identifying the additional communication device as being associated with the participating user, wherein data used for the identifying comprises one or more of:
a unique identification associated with the additional communication device;
an IP address of the additional communication device;
a MAC address of the additional communication device; and
account information associated with the participating user.

4. The system of claim 1, wherein the participant panel in the graphical user interface further comprises displayed identification information based on one of the following:
names of users associated with separate communication devices participating in the teleconference space; or
identities of communication devices participating in the teleconference space.

5. A computer-implemented method, comprising:
generating, using a computer coupled with a database and comprising a processor and memory, a teleconference space in which two or more communication devices each identified with two or more users participate;
transmitting requests to join the teleconference space to the two or more communication devices;
storing in the computer memory identification information for each of the two or more communication devices;
storing received audiovisual data comprising an audio stream and a visual stream associated with the two or more users associated with each of the two or more communication devices;
generating a graphical user interface for each of the two or more communication devices for displaying an outbound teleconference stream of the audiovisual data, wherein generating the graphical user interface further comprises:
a selectable hang-up button associated with each displayed visual stream, wherein when selected, the hang-up button disconnects its associated visual stream without interrupting a current presentation in the teleconference space;
one or more selectable graphical elements for controlling the teleconference space;
a presentation window displaying each of the visual streams transmitted to the participating user; and
a participant panel displaying a visual representation of communication devices currently participating in the teleconference space;
selecting, based on criteria, an audio stream and one or more visual streams from the received audiovisual data to transmit as the outbound teleconference stream;
combining the selected audio stream and the selected one or more visual streams for the outbound teleconference stream;
transmitting the outbound teleconference stream for display on each of the two or more communication devices;
joining the teleconference space by a participating user with an additional communication device;
combining the visual stream of the additional communication device with one or more existing visual streams of the participating user; and
displaying the combined visual streams on a graphical user interface of the participating user.

6. The computer-implemented method of claim 5, wherein the criteria for the selecting further comprises:
a visual stream transmitted by a communication device associated with a particular user that most recently joined the teleconference space;
a loudest or most clear audio stream transmitted by a communication device associated with a particular user;
a manual selection of a visual stream from a single communication device where a user participates in the teleconference space using multiple communication devices;
a manual selection of an audio stream from a single communication device where a user participates in the teleconference space using multiple communication devices; or
a combination of visual streams from multiple communication devices of a particular user.

7. The computer-implemented method of claim 5, further comprising identifying the additional communication device as being associated with the participating user, wherein data used for the identifying comprises one or more of:
a unique identification associated with the additional communication device;
an IP address of the additional communication device;
a MAC address of the additional communication device; and
account information associated with the participating user.

8. The computer-implemented method of claim 5, wherein generating the graphic user interface further comprises displaying identification information in the participant panel based on one of the following:
names of users associated with separate communication devices participating in the teleconference space; or
identities of communication devices participating in the teleconference space.

9. A non-transitory computer-readable storage medium embodied with software, the software when executed configured to:
generate, using a computer coupled with a database and comprising a processor and memory, a teleconference space in which two or more communication devices each identified with two or more users participate;
transmit requests to join the teleconference space to the two or more communication devices;
store in the computer memory identification information for each of the two or more communication devices;
store received audiovisual data comprising an audio stream and a visual stream associated with the two or more users associated with each of the two or more communication devices;
generate a graphical user interface for each of the two or more communication devices for displaying an outbound teleconference stream of the audiovisual data, wherein generating the graphical user interface further comprises:
- a selectable hang-up button associated with each displayed visual stream, wherein when selected, the hang-up button disconnects its associated visual stream without interrupting a current presentation in the teleconference space;
- one or more selectable graphical elements for controlling the teleconference space;
- a presentation window displaying each of the visual streams transmitted to the participating user; and
- a participant panel displaying a visual representation of communication devices currently participating in the teleconference space;

select, based on criteria, an audio stream and one or more visual streams from the received audiovisual data to transmit as the outbound teleconference stream;

combine the selected audio stream and the selected one or more visual streams for the outbound teleconference stream;

transmit the outbound teleconference stream for display on each of the two or more communication devices;

join the teleconference space by a participating user with an additional communication device;

combine the visual stream of the additional communication device with one or more existing visual streams of the participating user; and display the combined visual streams on a graphical user interface of the participating user.

10. The non-transitory computer-readable storage medium of claim 9, wherein the software when executed is further configured to select based on criteria comprising:
- a visual stream transmitted by a communication device associated with a particular user that most recently joined the teleconference space;
- a loudest or most clear audio stream transmitted by a communication device associated with a particular user;
- a manual selection of a visual stream from a single communication device where a user participates in the teleconference space using multiple communication devices;
- a manual selection of an audio stream from a single communication device where a user participates in the teleconference space using multiple communication devices; or
- a combination of visual streams from multiple communication devices of a particular user.

11. The non-transitory computer-readable storage medium of claim 9, wherein the software when executed is further configured to identify the additional communication device as being associated with the participating user, wherein data used for the identifying comprises one or more of:
- a unique identification associated with the additional communication device;
- an IP address of the additional communication device;
- a MAC address of the additional communication device; and
- account information associated with the participating user.

* * * * *